United States Patent
Makishima et al.

(10) Patent No.: US 7,177,742 B2
(45) Date of Patent: Feb. 13, 2007

(54) VEHICULAR AIR-CONDITIONER AND METHOD OF CONTROLLING THE SAME

(75) Inventors: Hiroyuki Makishima, Sano (JP); Hiroyasu Nadamoto, Tatebayashi (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/738,171

(22) Filed: Dec. 18, 2003

(65) Prior Publication Data

US 2004/0133320 A1 Jul. 8, 2004

(30) Foreign Application Priority Data

Dec. 19, 2002 (JP) .............................. 2002-368700

(51) Int. Cl.
*B60H 1/32* (2006.01)

(52) U.S. Cl. .................. 701/36; 62/133; 62/323.4; 62/209; 62/172; 62/241

(58) Field of Classification Search .................. 701/36, 701/67; 62/133, 323.4, 229, 209, 244, 230, 62/228.5, 323.1, 234, 228.1, 228.4, 215, 62/129, 146, 134, 172, 241, 236
See application file for complete search history.

(56) References Cited

U.S. PATENT DOCUMENTS

| | | | | |
|---|---|---|---|---|
| 4,305,258 A | * | 12/1981 | Spencer, Jr. ................ | 62/133 |
| 4,425,765 A | * | 1/1984 | Fukushima et al. ........... | 62/133 |
| 4,862,700 A | * | 9/1989 | Suzuki ....................... | 62/115 |
| 5,983,650 A | * | 11/1999 | Ando et al. .................. | 62/133 |
| 6,330,909 B1 | * | 12/2001 | Takahashi et al. ........... | 165/202 |
| 6,393,849 B1 | * | 5/2002 | Takenaka et al. ............. | 62/133 |
| 6,481,225 B2 | * | 11/2002 | Kimura et al. ................ | 62/133 |
| 6,484,520 B2 | * | 11/2002 | Kawaguchi et al. .......... | 62/133 |
| 6,601,395 B2 | * | 8/2003 | Kotwicki et al. ............. | 62/133 |
| 6,668,224 B2 | * | 12/2003 | Kawai et al. ................. | 701/54 |
| 6,691,522 B1 | * | 2/2004 | Kojima ....................... | 62/133 |
| 6,729,148 B2 | * | 5/2004 | Wakisaka et al. ............. | 62/133 |
| 2001/0015070 A1 | * | 8/2001 | Hara .......................... | 62/133 |
| 2001/0049943 A1 | * | 12/2001 | Nakamura et al. ......... | 62/176.6 |
| 2002/0020176 A1 | * | 2/2002 | Kimura et al. ................ | 62/133 |
| 2002/0092310 A1 | * | 7/2002 | Murase et al. ................ | 62/133 |
| 2002/0124580 A1 | * | 9/2002 | Suitou et al. ................. | 62/133 |
| 2003/0046946 A1 | * | 3/2003 | Nagai et al. .................. | 62/244 |
| 2003/0097848 A1 | * | 5/2003 | Egami ......................... | 62/133 |
| 2003/0192326 A1 | | 10/2003 | Masuda et al. | |
| 2003/0196442 A1 | | 10/2003 | Wakisaka et al. | |

FOREIGN PATENT DOCUMENTS

| | | | | |
|---|---|---|---|---|
| JP | 55031617 A | * | 3/1980 | |
| JP | 60082427 A | * | 5/1985 | |
| JP | 63-287624 A | | 11/1988 | |
| JP | 6-115346 A | | 4/1994 | |
| JP | 08295131 A | * | 11/1996 | |
| JP | 2001-105846 A | | 4/2001 | |
| JP | 2002012022 A | * | 1/2002 | |

* cited by examiner

*Primary Examiner*—Tuan C To
(74) *Attorney, Agent, or Firm*—Foley & Lardner LLP (57) ABSTRACT

A vehicular air-conditioner includes a compressor to be driven by an engine. The vehicular air-conditioner includes a controller configured to reduce a load on the compressor in response to a braking condition of a vehicle.

9 Claims, 7 Drawing Sheets

FIG. 8

VEHICULAR AIR-CONDITIONER AND METHOD OF CONTROLLING THE SAME

CROSS-REFERENCE TO RELATED APPLICATIONS

This application is based upon and claims the benefit of priority from Japanese Patent Application No. 2002-368700 filed on Dec. 19, 2002; the entire contents of which are incorporated herein by reference.

BACKGROUND OF THE INVENTION

The present invention relates to a vehicular air-conditioner which adjusts temperature environment of a vehicle interior.

In order to improve temperature environment of a vehicle interior, a vehicular air-conditioner sends conditioned air whose temperature adjustment has been performed to the vehicle interior. Japanese Patent Application Laid-open No. 2001-105846A discloses that elevating of a cooling performance of a heat exchanger for cooling during vehicle deceleration recovers deceleration energy of a vehicle without giving uncomfortable feeling to a vehicle occupant, thus advantageously saving fuel consumption. According to this, a vehicle occupant great feels more uncomfortable, as a blow-off temperature of conditioned air into the vehicle interior varies greater. On the other hand, the limitation of variation range for a vehicle occupant not to feel uncomfortable is varied according to a blow-off air-flow rate into the vehicle interior. In view of this fact, a target evaporator has a decrement of blow-off temperature during vehicle deceleration. The decrement of the blow-off temperature is set to become smaller, as a target air-flow rate becomes from Low towards High. Thereby, the decrement becomes great when an air blow rate is small, thus advantageously saving fuel consumption without giving uncomfortable feeling to a vehicle occupant.

A compressor in an air-conditioner is operating even during vehicle deceleration. Even when a throttle interlocked to an accelerator pedal is in a full closed state, an idle speed control valve (hereinafter, "ISC valve") which controls engine revolutions during idling operation is opened or closed. The opening or closing permits an intake air volume to be increased, thus increasing the engine revolutions. This permits an engine to be controlled not to stop due to a load of the compressor.

A passenger vehicle employs a brake apparatus. The brake apparatus utilizes a differential pressure between the atmosphere pressure and a boost pressure of the engine to amplify a pressing force of a driver on a brake pedal until the force reaches a braking force sufficient to stop a vehicle during running thereof.

Accordingly, when the throttle is fully closed in a state that an air-conditioner is operating, an intake air volume into the engine is increased by the ISC valve for operating the compressor. The boost pressure is maintained due to the increase until the throttle is fully closed in a state that the air-conditioner has stopped. That is, a differential pressure between the atmospheric pressure and the boost pressure is reduced, deteriorating engine braking effect. Thus, there is a possibility that the reduction of the differential pressure deteriorates a braking performance in dependence on the structure of the brake apparatus.

SUMMARY OF THE INVENTION

An object of the present invention is to provide a vehicular air-conditioner which reduces a load on an engine during vehicle deceleration.

A first aspect of the invention is directed to a vehicular air-conditioner. The air-conditioner includes a compressor to be driven by an engine. The air-conditioner includes a controller configured to reduce a load on the compressor in response to a braking condition of a vehicle.

The compressor may include a clutch configured to transmit torque from the engine to the compressor. The controller is configured to disengage the clutch to stop the compressor under the braking condition of the vehicle.

The compressor may have a variable displacement compressor.

The controller is configured to reduce a coolant in discharge rate from the compressor under the braking condition of the vehicle.

The controller may be configured to stop reducing of a load on the compressor in response to a non-braking condition of the vehicle.

The controller may include a first controller configured to control the engine and to determine the braking condition of the vehicle. The controller may include a second controller configured to reduce a load on the compressor in response to the braking condition of the vehicle.

The braking condition may include a first condition of a predetermined vehicle speed or more or predetermined engine revolutions or more. The braking condition may include a second condition of pressing-down of a brake pedal, lighting of a tail lamp or increase of a brake hydraulic pressure. The braking condition may include a third condition of release of an accelerator pedal.

A second aspect of the invention is directed to a method of controlling a vehicular air-conditioner. The control method includes the step of determining a braking condition of a vehicle. The control method includes the step of reducing a load on a compressor in response to the braking condition of the vehicle.

The determining of the braking condition of the vehicle may include the step of determining a predetermined vehicle speed or more or predetermined engine revolutions or more. The determining of the braking condition may include the step of determining pressing-down of a brake pedal, lighting of tail lamp or increase of a brake hydraulic pressure. The determining of the braking condition may include the step of determining release of an accelerator pedal.

DETAILED DESCRIPTION OF THE PREFERRED EMBODIMENTS

Embodiments of the present invention are described with reference to the drawings.

Figure 1:
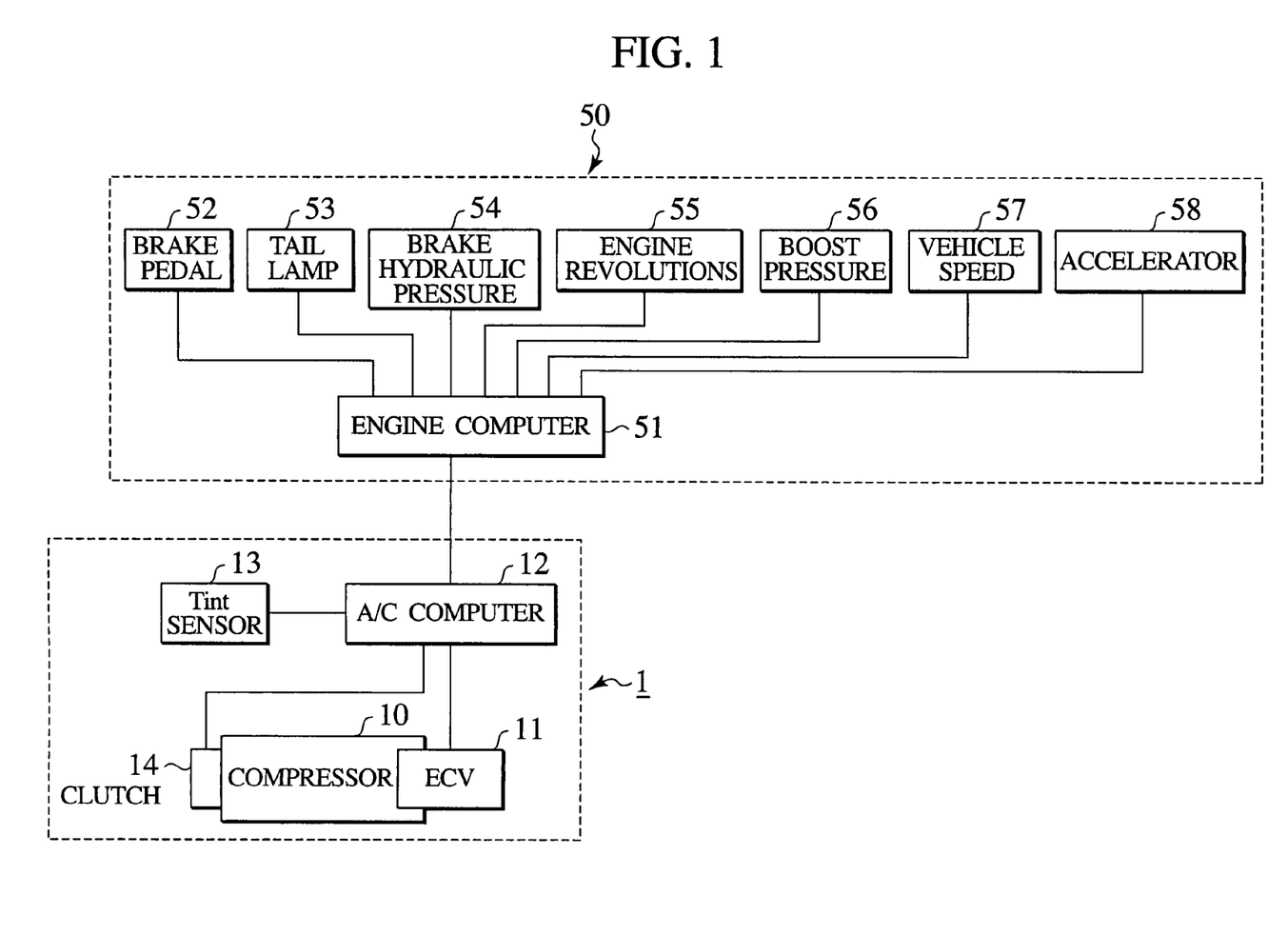
FIG. 1 is a block diagram illustrating a vehicular air-conditioner of an embodiment according to the present invention.

A vehicular air-conditioner 1 according to an embodiment utilizes an engine driving force as a power source, as indicated in FIG. 1. The air-conditioner 1 includes a variable displacement compressor 10 which can change a discharge rate of coolant according to a set temperature in a vehicle interior. The air-conditioner 1 includes an electromagnetic control valve (ECV) 11. The air-conditioner 1 includes a clutch 14 which transmits torque from an engine to the compressor. The air-conditioner 1 includes an air-conditioner computer (A/C computer) 12 which controls the compressor 10 under an operating condition. The A/C computer 12 is electrically connected to the ECV 11 and the clutch 14. The air-conditioner 1 includes a Tint sensor 13 which measures an air temperature to be introduced into the air-conditioner 1.

The compressor 10 compresses or discharges coolant supplied inside of a cylinder when a piston reciprocates inside the cylinder provided inside a main body of the compressor. Variation of an internal pressure in a crank chamber can cause a stroke amount of the reciprocating piston to change a discharge rate of the coolant.

The ECV 11 introduces a high pressure in a discharge chamber into the crank chamber and is controlled by an external signal.

The A/C computer 12 calculates and determines a target evaporator passing-through air temperature on the basis of a vehicle interior temperature sensor, an outside air temperature sensor output, a solar radiation sensor, and respective set values (blower temperature). The A/C computer 12 outputs a signal to the ECV 11 so as to establish the target value.

The A/C computer 12 transmits or receives signals to or from an engine computer 51 which performs engine control by a vehicle body equipment 50. The engine computer 51 has signals to be inputted from various sensors. That is, the engine computer receives sensor signals about a brake pedal 52, a tail lamp 53, a brake hydraulic pressure 54, engine revolutions 55, a boost pressure 56, a vehicle speed 57 and an accelerator 58 in order to determine a running condition of a vehicle.

The A/C computer 12 acquires sensor signals through the engine computer 51. The A/C computer 12 determines "braking condition" of a vehicle on the basis of these sensor signals to control the ECV 11. Such a constitution may be employed that the engine computer 51 determines the "braking condition" of the vehicle on the basis of the sensor signals to transmit the results to the A/C computer 12.

One example of a control method of the air-conditioner 1 is described with reference to FIG. 2.

First, when a switch of the air-conditioner 1 is turned on, control starts (S1). Next, the engine computer 51 transmits sensor signals to the A/C computer 12. The A/C computer 12 determines whether or not the vehicle is under a braking condition on the basis of the sensor signals (S2).

In case of the vehicle under a "non-braking condition", the A/C computer 12 controls the ECV 11 according to a normal control (S3). On the other hand, when the vehicle is under a braking condition during running, the A/C computer 12 confirms an upper limit value of the Tint (S4) to perform a load reduction control to the ECV 11 (S5).

Figure 5:
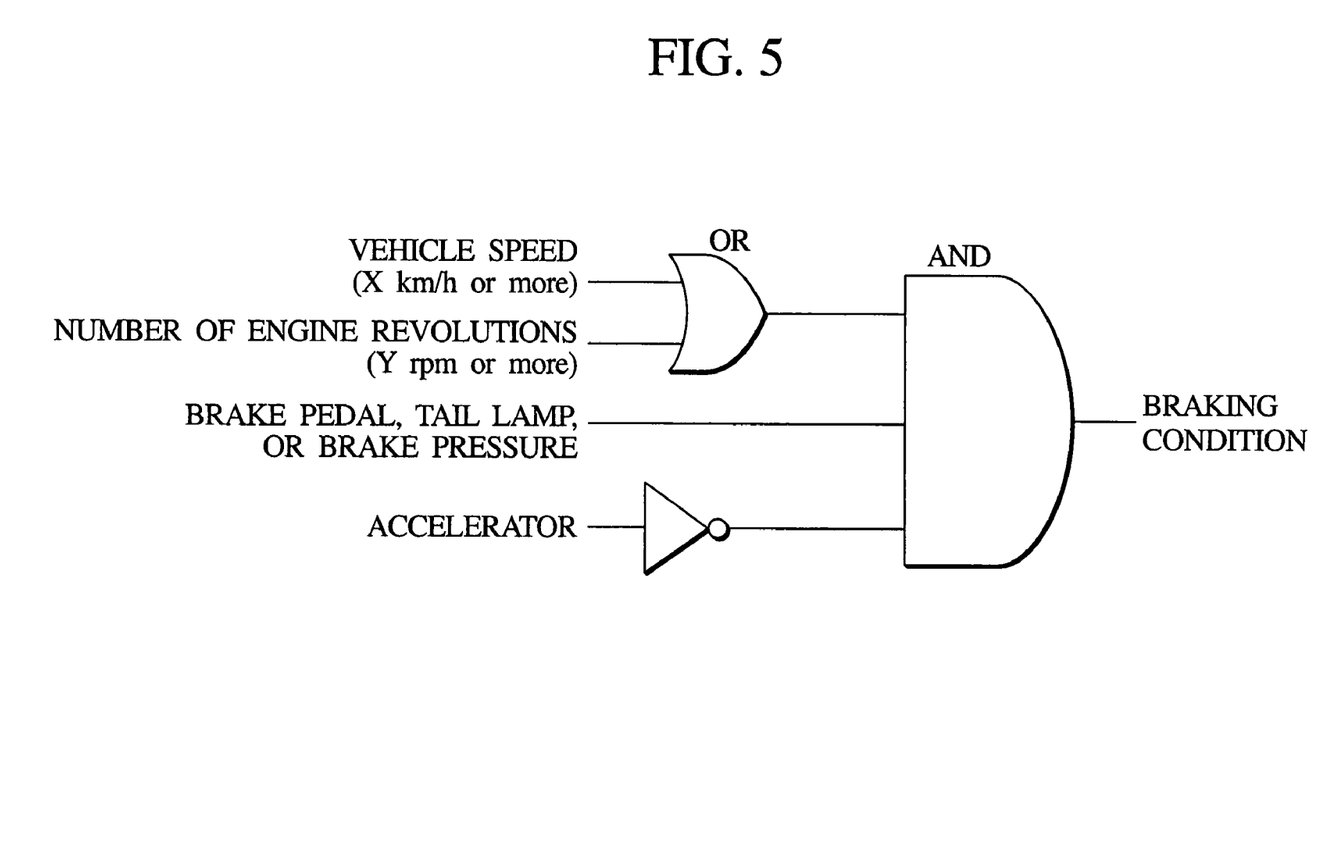
FIG. 5 is a diagram illustrating a logic circuit about conditions of the braking condition.

With reference to FIG. 5, the "braking condition" in step S2 is determined according to an AND with the following first, second and third conditions. The first condition is a vehicle speed equal to or more than X (km/h) or engine revolutions equal to or more than Y (rpm). The second condition is a pressing-down of the brake pedal 52, a lighting of the tail lamp 53 or increase of the brake hydraulic pressure 54. The third condition is a state that the accelerator pedal has not been pressed, or release of the accelerator pedal.

Control of the steps S2, S3, S4 and S5 is repeated until the switch in the air-conditioner 1 is turned off.

Figure 3:
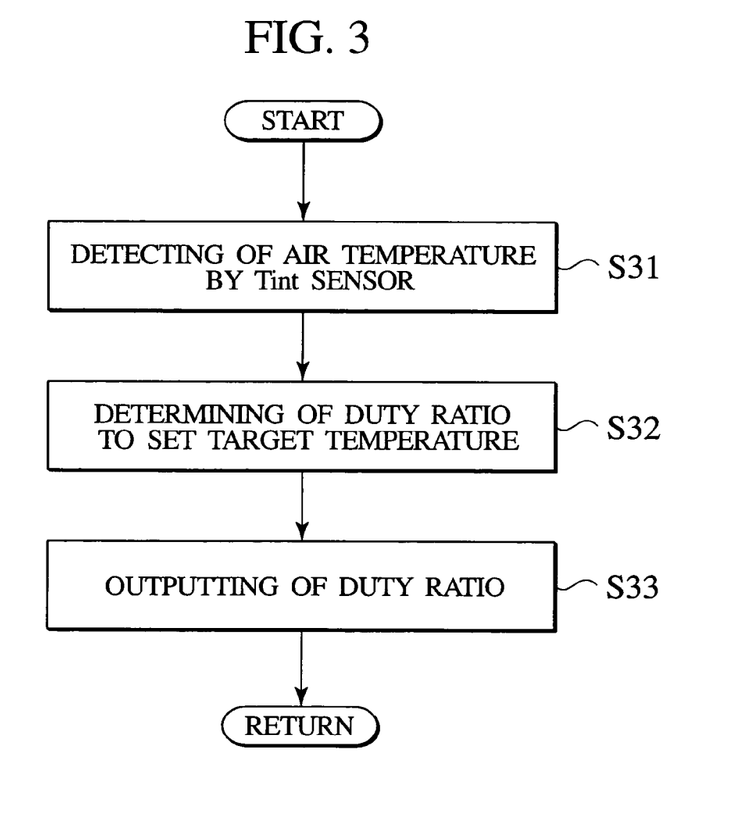
FIG. 3 is a flowchart illustrating a normal control in an A/C computer.

With reference to a flowchart indicated in FIG. 3, the normal control S3 under the "non-braking condition" is described.

The Tint sensor 13 detects an air temperature introduced into the air-conditioner 1 (S31).

Next, the A/C computer 12 calculates a difference between an output temperature of the Tint sensor 13 and a set target temperature of a vehicle interior. The A/C computer 12 calculates DUTY ratio of PWM control from the temperature difference (S32). The A/C computer 12 outputs the DUTY ratio to the ECV 11 to control opening or closing of the ECV11 (S33).

Figure 2:
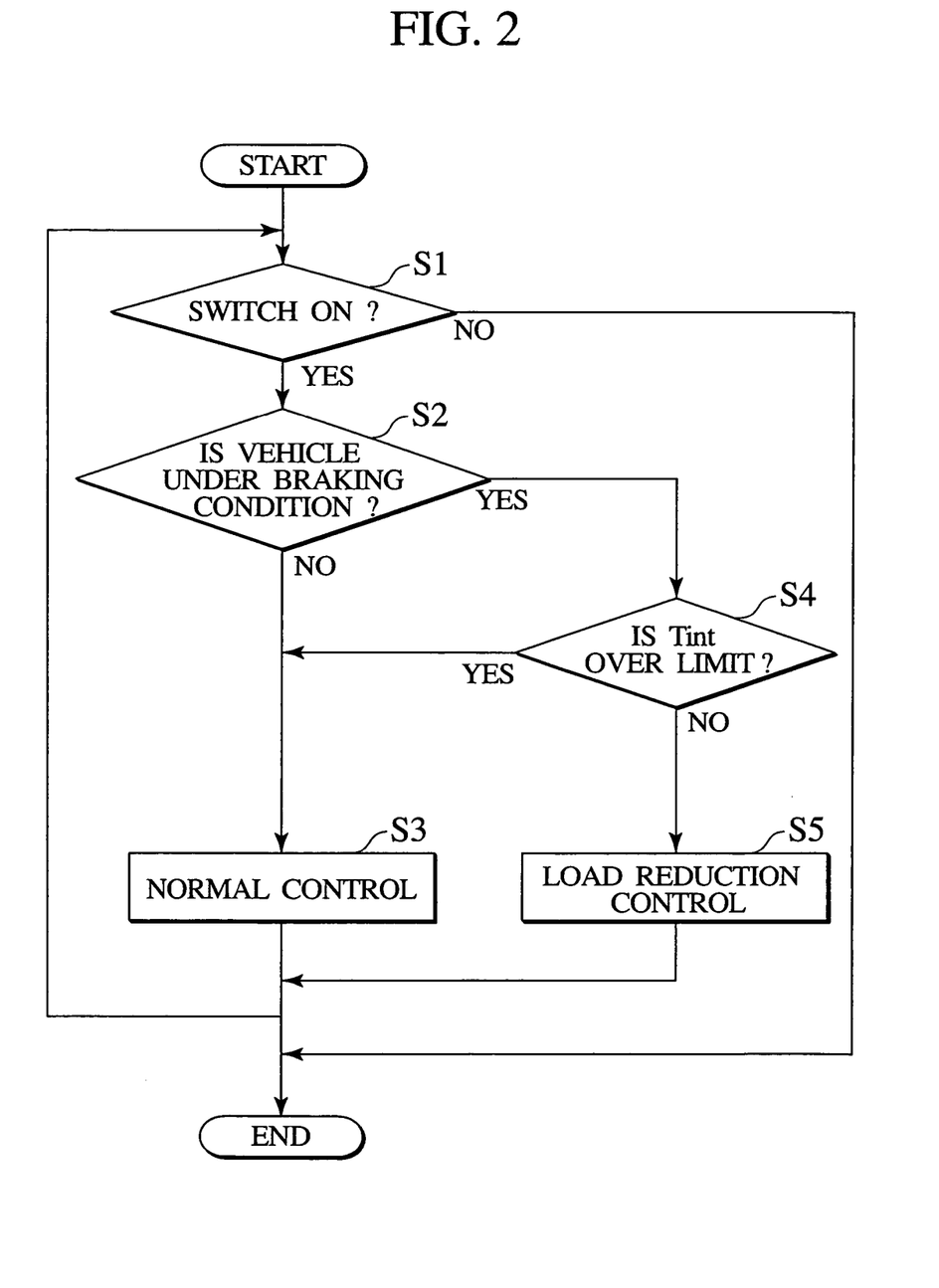
FIG. 2 is a flowchart illustrating control of the air-conditioner indicated in FIG. 1.
Figure 4:
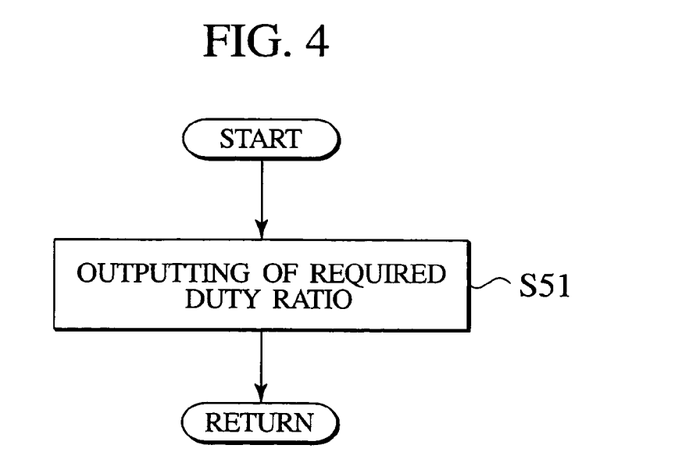
FIG. 4 is a flowchart illustrating a load reduction control of a vehicle braking condition in the A/C computer.

A control method in the "braking condition" is described on the basis of a flowchart indicated in FIGS. 2 and 4.

In FIG. 2, the A/C computer 12 determines whether or not a temperature Tint of air introduced into the air-conditioner 1 exceeds a predetermined upper limit value (S4).

Here, there is a possibility that the Tint over the upper limit value increases a vehicle interior temperature to give uncomfortable feeling to a vehicle occupant. Accordingly, the A/C computer 12 performs the normal control S3. On the other hand, when the Tint is equal to or less than the upper limit value, the control of the A/C computer 12 performs the load reduction control S5.

In FIG. 4, the A/C computer 12 under the load reduction control S5 outputs a required DUTY ratio to the EVC 11 (S51). That is, reducing of the DUTY ratio of the ECV11 reduces an opening degree of the ECV11. This establishes the stroke amount of the compressor 10 at substantially zero, thus reducing an engine load. On the other hand, the A/C computer 12 may disconnect the clutch 14 to stop the compressor 10. Further, the A/C computer 12 may reduce a discharge rate of coolant of the compressor 10.

Figure 6:
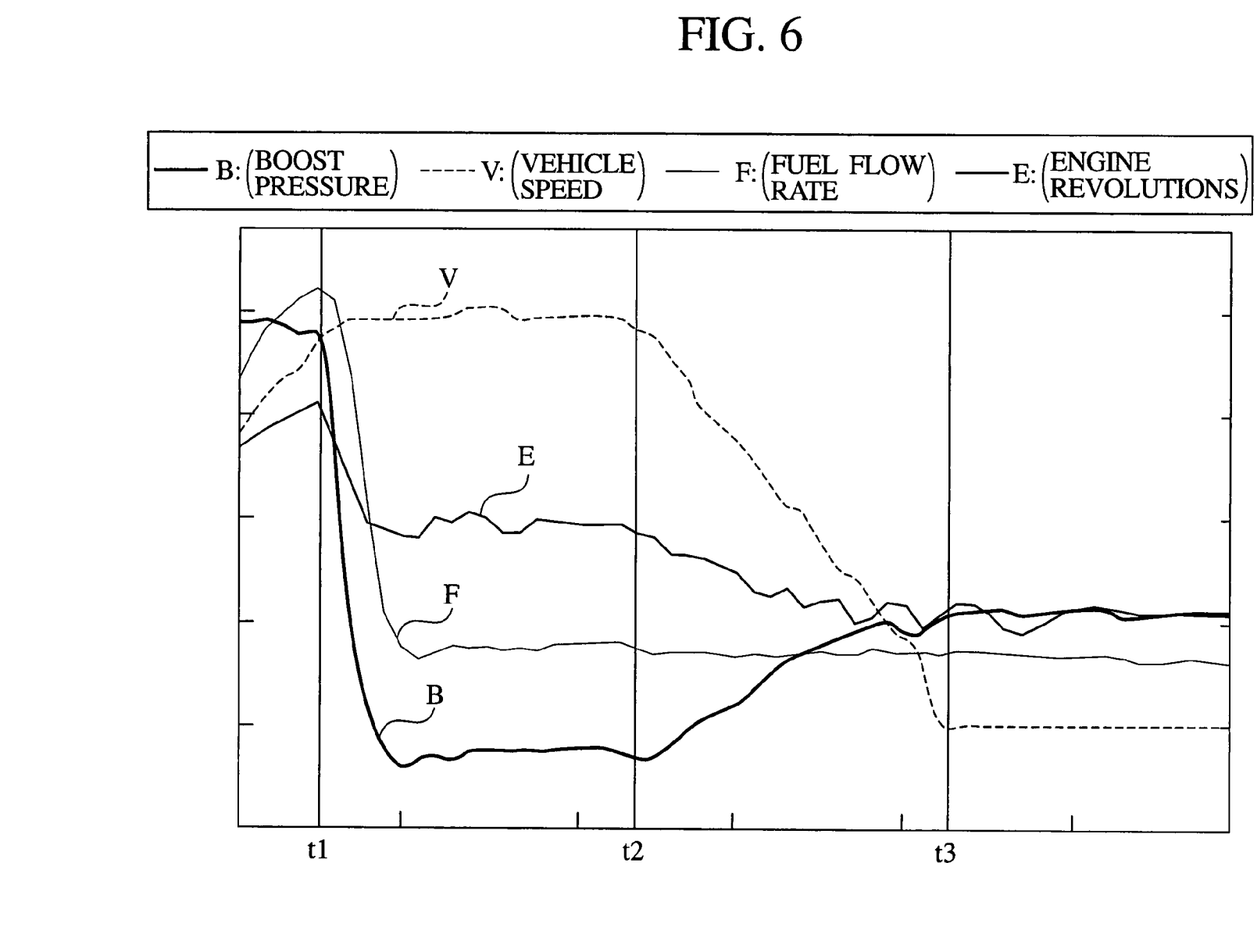
FIG. 6 is a graph illustrating variation of a boost pressure during baking, while the air condition indicated in FIG. 1 is operating.
Figure 7:
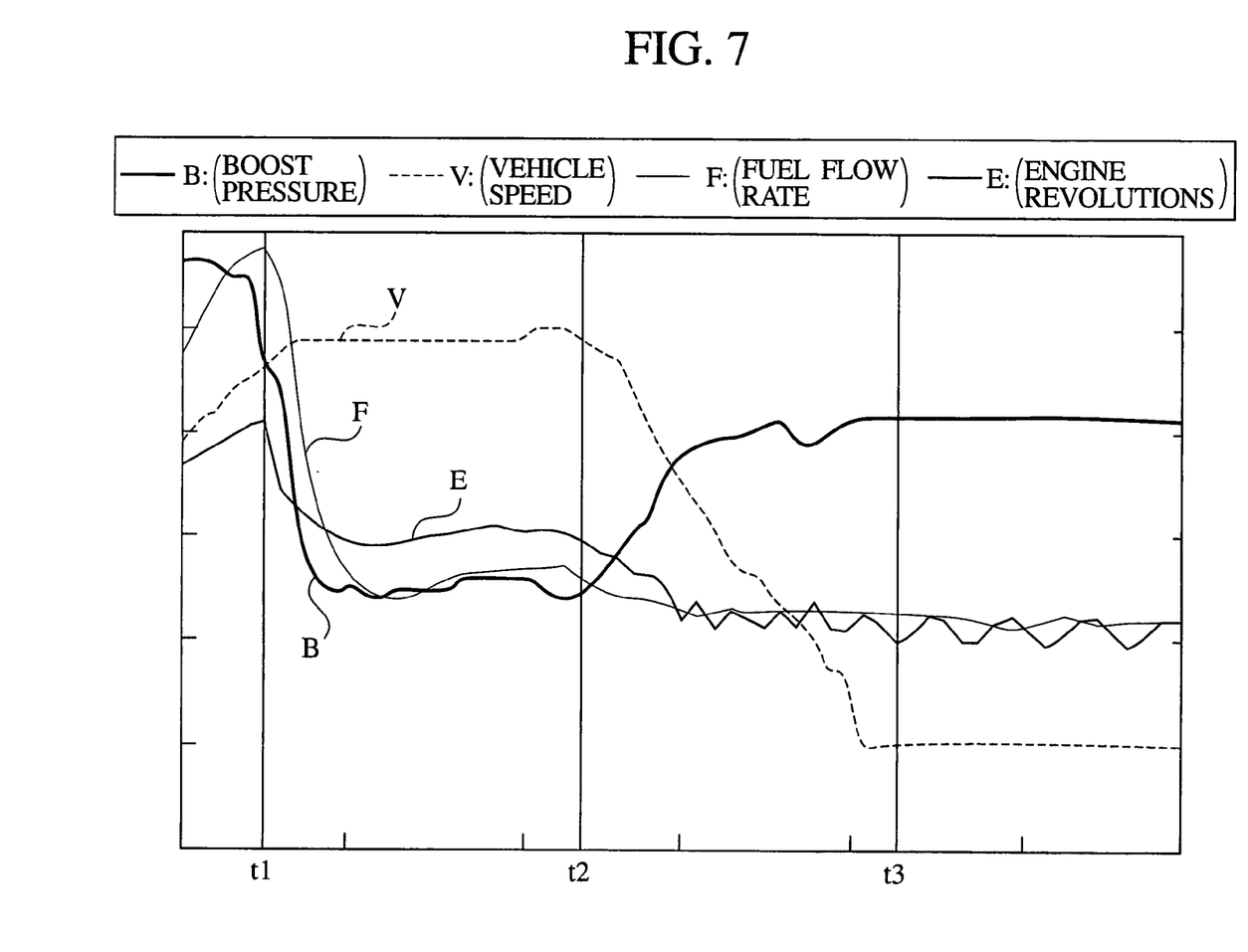
FIG. 7 is a graph illustrating variation of the boost pressure during baking, while a comparative air-conditioner is operating.

With reference to FIGS. 6 and 7, variations of boost pressures in the air-conditioner 1 and a comparative air-conditioner during operation is described. A vehicle is under an accelerating condition before at time t1. The vehicle is under a constant running condition between times t1 and t2. The vehicle is under a braking condition between times t2 and t3. The vehicle is put in an idling condition on time t3 and thereafter. The air-conditioner 1 is put in an operating condition for the whole period of time.

From comparison of FIGS. 6 and 7 to each other, the air-conditioner 1 has small variation of the boost pressure B during the braking condition of the vehicle (times t2 to t3) as compared with the comparative air-conditioner. Accordingly, the boost pressure due to the air-conditioner 1 is sufficiently lowered as compared with that in the comparative air-conditioner.

This causes the load reduction control to reduce the strove amount of the compressor 1 during the braking condition of the vehicle, thus reducing an engine load. Thereby, the opening degree of the ISC valve can be reduced in the full closed state of the throttle. Therefore, decrease in the intake air volume into the engine allows the boost pressure is lowered.

Figure 8:
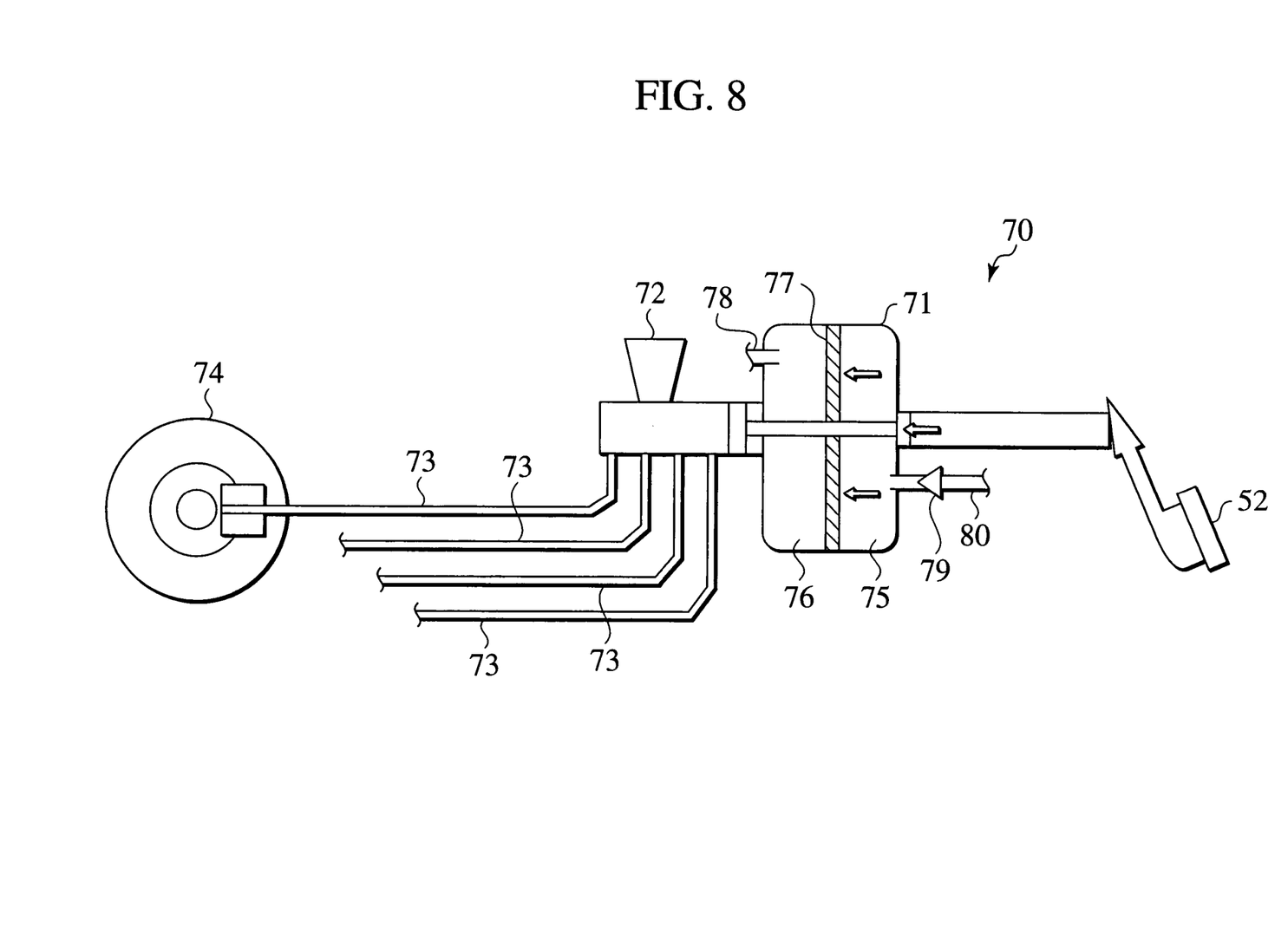
FIG. 8 is a schematic diagram illustrating a structure of a brake apparatus.

With reference to FIG. 8, a brake apparatus 70 is used in a passenger vehicle. The brake apparatus 70 has a brake pedal 52 to be pressed down by a driver. The brake apparatus 70 includes a master vac 71 boosting a pressing force of the brake pedal 52. The brake apparatus 70 includes a master cylinder 72 which converts the boosted pressing force to a hydraulic pressure. The brake apparatus 70 includes hydraulic pressure pipes 73 which transfer the converted hydraulic pressure to respective wheels. The brake apparatus 70 has brake discs 74 to rotate together with the respective wheels. According to the brake apparatus 70, pressing-down of the brake pedal 52 performed by a driver permits a piston in the master cylinder 72 to push brake pads against the brake discs 74. Frictions between the brake pads and the brake discs 74 obtains a braking force.

The master vac 71 has an internal space separated into an atmospheric pressure chamber 75 and a boost pressure chamber 76. The master vac 71 includes a piston 77 provided slidably so as to change volumes of the atmospheric pressure chamber 75 and the boost pressure chamber 76. The master vac 71 includes a boost pressure pipe 78 for supplying a boost pressure to the boost pressure chamber 76. The master vac 71 includes an atmospheric pressure pipe 80 provided with an atmospheric pressure ECV 79 for controlling an air volume introduced into the atmospheric pressure chamber 75.

When the brake pedal 52 is pressed down, the master vac 71 opens the atmospheric pressure ECV 79 according to the pressing force. Thereby, the piston 77 is pulled from the atmospheric pressure chamber 75 towards the boost pressure chamber 76 so that the pressing force is amplified. The amplified pressing force is transferred to the master cylinder 72.

Accordingly, by causing the boost pressure during braking condition to approach to the boost pressure put in a state where the air-conditioner is not operating. This enlarges the amplifying ratio of the pressing force conducted by the master baek vac 71, thus stabilizing the braking force.

As described above, the control apparatus of the compressor determines the current state as the "braking condition" to perform the load reduction control. The control reduces an intake air volume required for decreasing the engine load to maintain the engine revolutions. Thereby, the opening degree of the ISC valve can be narrowed, which lowers the boost pressure of the engine in the vicinity of the stopped condition of the air-conditioner. Accordingly, a stable braking performance is obtained even while the interior air conditioning is being performed.

In case that the control apparatus determines that the vehicle is under the "non-braking condition", the load reduction control is terminated. Thereby, the load reduction control is performed during the braking condition of the vehicle, which reduces the engine load without giving uncomfortable feeling to a vehicle occupant.

This control permits the boost pressure to be lowered down to about the stopped condition of the air-conditioner for vehicle. Thereby, the engine brake acts in the identical manner to the stopped condition of the vehicular air-conditioner, thus achieving a further strong braking force.

In this embodiment, the compressor 10 is employed to change the stroke amount of the piston, thus reducing the engine load. On the other hand, a compressor with a clutch 14 for transmission of torque from the engine may be employed to disconnect the clutch 14 during braking condition of the vehicle to stop operation of the compressor. Thereby, a similarly advantageous effect can be obtained even if the engine load is reduced.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A vehicular air-conditioner comprising:
   a compressor to be driven by an engine; and
   a controller configured to reduce a load on the compressor in response to a braking condition of a vehicle,
   wherein the compressor includes a clutch configured to transmit torque from the engine to the compressor,
   wherein the controller is configured to disengage the clutch to stop the compressor under the braking condition of the vehicle, and
   wherein the controller includes:
   a first controller configured to control the engine and to determine the braking condition of the vehicle, and
   a second controller configured to reduce a load on the compressor in response to the braking condition of the vehicle.

2. The vehicular air-conditioner according to claim 1, further comprising:
   a brake apparatus configured to amplify a pressing force on a brake pedal by a driver using a differential pressure between a boost pressure of the engine and an atmospheric pressure,
   wherein operation of the brake apparatus is detected.

3. A vehicular air-conditioner comprising:
   a compressor to be driven by an engine; and
   a controller configured to reduce a load on the compressor in response to a braking condition of a vehicle,
   wherein the compressor has a variable displacement compressor,
   wherein the controller is configured to reduce a coolant in discharge rate from the compressor under the braking condition of the vehicle, and
   wherein the controller includes:
   a first controller configured to control the engine and to determine the braking condition of the vehicle, and
   a second controller configured to reduce a load on the compressor in response to the braking condition of the vehicle.

4. The vehicular air-conditioner according to claim 3, wherein the controller is configured to stop reduction of a load on the compressor in response to a non-braking condition of the vehicle.

5. The vehicular air-conditioner according to claim 3, further comprising:
   a brake apparatus configured to amplify a pressing force on a brake pedal by a driver using a differential pressure between a boost pressure of the engine and an atmospheric pressure,
   wherein operation of the brake apparatus is detected.

6. A vehicular air-conditioner comprising:
   a compressor to be driven by an engine; and
   a controller configured to reduce a load on the compressor in response to a braking condition of a vehicle, wherein the braking condition includes,
   a first condition of a predetermined vehicle speed or more or predetermined engine revolutions or more;
   a second condition of pressing-down of a brake pedal, lighting of a tail lamp or increase of a brake hydraulic pressure; and
   a third condition of release of an accelerator pedal.

7. The vehicular air-conditioner according to claim 6, wherein the controller is configured to stop reduction of a load on the compressor in response to a non-braking condition of the vehicle.

8. A vehicular air-conditioner comprising:
a compressor to be driven by an engine; and
a controller configured to reduce a load on the compressor in response to a braking condition of a vehicle,
wherein the braking condition is indicated by the following conditions:
   a first condition wherein either a predetermined vehicle speed or a predetermined engine revolution is exceeded;
   a second condition wherein either a brake pedal has been pressed down or a brake hydraulic pressure is increased; and
   a third condition wherein a release of an accelerator pedal is sensed.

9. A vehicular air-conditioner comprising:
a compressor to be driven by an engine; and
a controller configured to reduce a load on the compressor in response to a braking condition of a vehicle, wherein the controller is configured to stop reduction of a load on the compressor in response to a non-braking condition of the vehicle, and wherein the controller includes a first controller configured to control the engine and to determine the braking condition of the vehicle, and a second controller configured to reduce a load on the compressor in response to the braking condition of the vehicle,
wherein the braking condition includes,
   a first, condition of a predetermined vehicle speed or more or predetermined engine revolutions or more;
   a second condition of pressing-down of a brake pedal, lighting of a tail lamp or increase of a brake hydraulic pressure; and
   a third condition of release of an accelerator pedal.

* * * * *